(12) United States Patent
Maruyama

(10) Patent No.: US 8,633,712 B2
(45) Date of Patent: Jan. 21, 2014

(54) ELECTRONIC DEVICE AND OPERATION DETECTION METHOD

(75) Inventor: Shigeaki Maruyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 378 days.

(21) Appl. No.: 13/074,332

(22) Filed: Mar. 29, 2011

(65) Prior Publication Data

US 2011/0248728 A1  Oct. 13, 2011

(30) Foreign Application Priority Data

Apr. 7, 2010  (JP) ................................ P2010-088283

(51) Int. Cl.
*G01R 27/26* (2006.01)
(52) U.S. Cl.
USPC .......................................... 324/658; 324/671
(58) Field of Classification Search
USPC .......................................... 324/457, 658–690
See application file for complete search history.

(56) References Cited

U.S. PATENT DOCUMENTS 5,801,682 A * 9/1998 Coni et al. ..................... 345/174
2011/0037487 A1* 2/2011 Fang et al. ..................... 324/679

FOREIGN PATENT DOCUMENTS

JP  2005-018669  1/2005

* cited by examiner

*Primary Examiner* — Vincent Q Nguyen
(74) *Attorney, Agent, or Firm* — Sherr & Jiang, PLLC

(57) ABSTRACT

An electronic device includes an input plane member that includes a plurality of first conductive layers that is elastically deformed when a pressing operation is received from a user, a base that includes a plurality of second conductive layers that comes in contact with the first conductive layer when the input plane member is deformed, a capacitance detection unit that detects capacitance between the plurality of first conductive layers and between the plurality of second conductive layers, a resistance value detection unit that detects a resistance value between the first conductive layer and the second conductive layer when the first conductive layer comes in contact with the second conductive layer, and a switch unit that controls electrical connection between the first conductive layer and the second conductive layer and either of the capacitance detection unit and the resistance value detection unit.

12 Claims, 8 Drawing Sheets

ELECTRONIC DEVICE AND OPERATION DETECTION METHOD

BACKGROUND OF THE INVENTION

1. Field of the Invention

The present invention relates to an electronic device and an operation detection method.

2. Description of the Related Art

In recent years, a device in which a sensor of a touch panel type is disposed integrally with a display screen in a mobile device such as a portable telephone, a laptop computer, or the like has been disclosed. For example, Japanese Patent Application Laid-Open (JP-A) No. 2005-18669 discloses a technique in which a pseudo pressing judgment is assumed to be performed while a stable on/off operation in a switch operation of an electrostatic coupling type touch panel is secured.

SUMMARY OF THE INVENTION

As a device for detecting a two-dimensional position on an input plane of a user's finger, a stylus operated by the user, or the like, a resistive touch panel and a capacitive touch panel have been known. Depending on the resistive touch panel, a two-dimensional position is solely detected, and depending on the capacitive touch panel, only a two-dimensional position is typically detected.

However, in the electrostatic coupling type touch panel, since processing is performed based on capacitance, it is difficult to accurately perform a judgment of pressing force particularly. Meanwhile, in the resistive touch panel, pressing force of a predetermined value or more needs be provided from the user so that conductive layers disposed to face each other can come in contact with each other. In the case of pressing force that does not cause the conductive layers to contact each other, an output is not obtained, and it is difficult to perform a position detection from the beginning of an operation (the contact start) by the user with a high degree of accuracy.

Further, in order to detect force (an operation) that the user or the stylus applies to the input plane, in addition to the resistive touch panel or the capacitive touch panel, an operation force sensor for detecting operation force needs be installed separately.

However, when the operation force sensor is separately installed, there have been the following problems. In an application for an electronic device, since the separately installed operation force sensor is disposed to be inserted between a touch panel for detecting a two-dimensional position and a case of the electronic device, a performance of the operation force sensor is influenced by, for example, flatness of the case of the electronic device. For this reason, it is difficult to guarantee a performance as a single operation force sensor.

Further, when the input plane is disposed on a display device such as a liquid crystal display (LCD) like the touch panel, a plurality of operation force sensors are disposed around a peripheral section in order not to hinder an image. In this case, force distributed to each sensor greatly depends on a degree of accuracy of installation of a sensor. Meanwhile, there are many cases in which a relationship between operation force applied to each sensor and an output signal is not linear. Thus, it is very difficult to detect force applied to the input plane with accuracy. Further, since the operation force sensor is separately installed, there is a problem in that the manufacturing cost increases.

Further, JP-A No. 2005-18669 discloses a technique of detecting an area that comes in contact with the touch panel and judging pressing force in a pseudo fashion as the capacitive touch panel. However, detection of an area using the capacitance is greatly influenced by environmental factors such as a state (e.g., perspiration) or moisture of the user's finger, and thus there is a problem in that it is difficult to perform practical measurement.

In light of the foregoing, it is desirable to provide an electronic device and an operation detection method which are novel and improved, and which are capable of performing both position detection and pressing force detection on a touch sensor with a high degree of accuracy.

According to an embodiment of the present invention, there is provided an electronic device, includes an input plane member that includes a plurality of first conductive layers formed in an island shape and is elastically deformed when a pressing operation is received from a user, a base that is disposed to face the input plane member and includes a plurality of second conductive layers with an island shape that comes in contact with the first conductive layer when the input plane member is deformed, a capacitance detection unit that detects capacitance between the plurality of first conductive layers and between the plurality of second conductive layers, a resistance value detection unit that detects a resistance value between the first conductive layer and the second conductive layer when the first conductive layer comes in contact with the second conductive layer due to deformation of the input plane member, and a switch unit that controls electrical connection between the first conductive layer and the second conductive layer and either of the capacitance detection unit and the resistance value detection unit.

In this configuration, the first conductive layer and the second conductive layer have a stripe shape together and extend in a direction orthogonal to each other.

In this configuration, the electronic device includes a display screen that displays information, the input plane member and the base are made of a transparent material and are installed on the display screen.

In this configuration, the electronic device includes a capacitance calculation unit that calculates, based on a change of the capacitance, a two-dimensional position on the input plane member by the user's pressing operation or how close an operation by the user approaches the input plane member.

In this configuration, the electronic device includes a resistance value calculation unit that calculates at least pressing force applied to the input plane member based on the resistance value.

In this configuration, pressing force applied to the input plane member is calculated based on the number of contact points when the first conductive layer comes in contact with the second conductive layer by the user's pressing operation.

In this configuration, the resistance value calculation unit calculates a two-dimensional position on the input plane member of the user's pressing operation based on the resistance value.

In this configuration, the electronic device includes a resistance value back calculation unit that back-calculates theoretical resistance values of the first conductive layer and the second conductive layer in a two-dimensional position on the input plane member by the user's operation based on the two-dimensional position. The resistance value calculation unit finds the number of contact points when the first conductive layer comes in contact with the second conductive layer by the user's pressing operation. The electronic device includes a correction unit that compares the theoretical resistance value with the detected resistance value and corrects pressing force found based on the number of contact points.

According to another embodiment of the present invention, there is provided an operation detection method in a touch sensor includes an input plane member that includes a plurality of first conductive layers formed in an island shape and a base that includes a plurality of second conductive layers formed in an island shape and orthogonal to the first conductive layers. The method includes the steps of detecting capacitance between the plurality of first conductive layers and between the plurality of second conductive layers, and detecting a resistance value between the first conductive layer and the second conductive layer when the first conductive layer comes in contact with the second conductive layer due to deformation of the input plane member by a user's pressing operation.

According to the present invention, an electronic device and an operation detection method that are capable of performing both position detection and pressing force detection on a touch sensor with a high degree of accuracy can be provided.

DETAILED DESCRIPTION OF THE EMBODIMENT(S)

Figure 1:
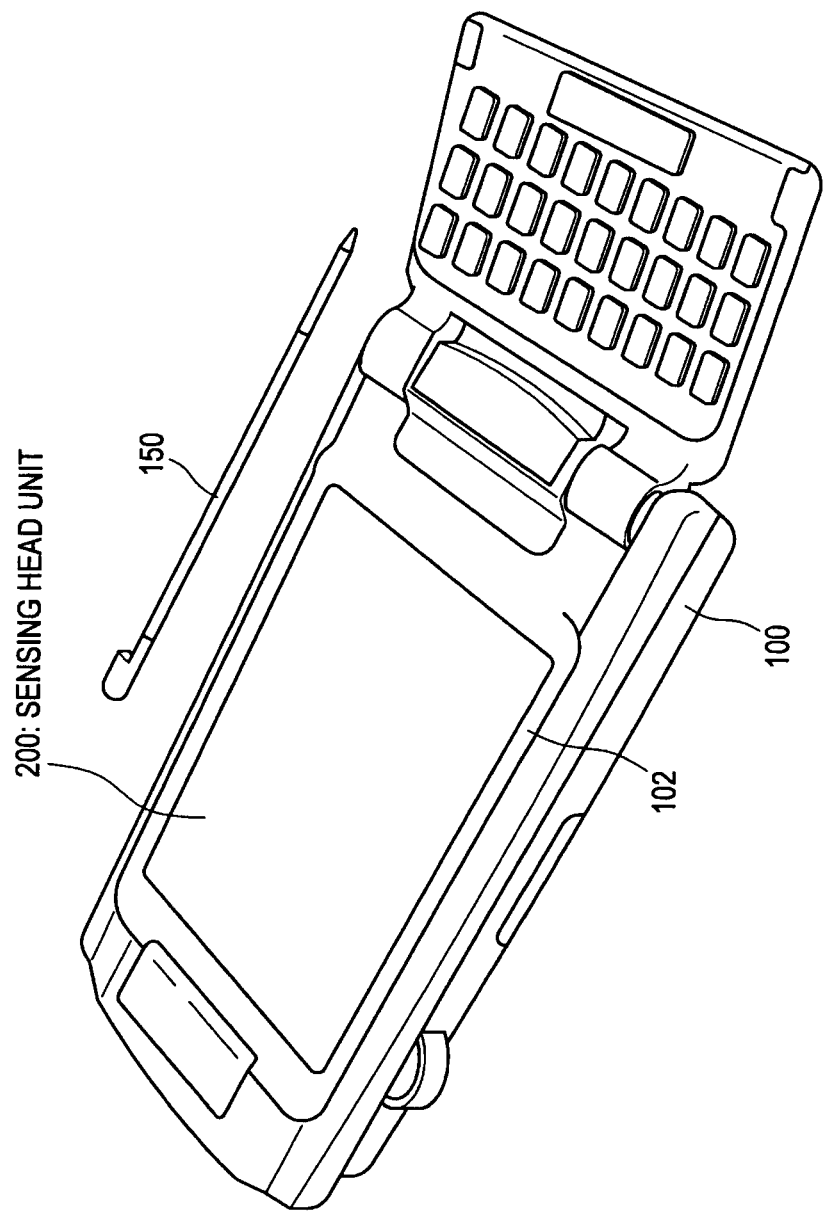
FIG. 1 is a perspective view illustrating an appearance of an information processing device.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Further, a description will be made in the following order:
1. Appearance Example of Information Processing Device
2. Configuration of Sensing Head Unit
3. Functional Block Configuration of Information Processing Device
4. Operation of Information Processing Device According to Present Embodiment
5. Detection of Pressing Force

[1. Appearance Example of Information Processing Device]

First, a schematic configuration of an information processing device according to an embodiment of the present invention will be described with reference to FIG. 1. FIG. 1 is a perspective view illustrating an appearance of the information processing device 100. The information processing device 100 is a device, such as a mobile device having a portable telephone function such as a personal digital assistant (PDA) or a smart phone.

As illustrated in FIG. 1, the information processing device 100 includes a display unit 102 that displays various kinds of information. On a surface of the display unit 102, a sensing head unit 200 is installed. The sensing head unit 200 includes a sensor such as a touch panel or a touch pad. When the user's finger, a stylus 150, or the like comes in contact with the surface of the display unit 102, the sensing head unit 200 detects it and implements a function corresponding to the user's operation. The function corresponding to the user's operation includes various functions such as a start of an application, a scroll of a screen, and an update of a screen.

In the present embodiment, the sensing head unit 200 (an input device) of a nearly planar shape such as a touch panel or a touch pad detects not only a two-dimensional position (a position on a plane) when the user's finger or the stylus 150 contacts the surface of the sensing head unit 200 but also a position in a direction orthogonal to the plane. In the present embodiment, a state in which the finger or the stylus 150 is present above the sensing head unit 200 is detected, and pressing force after contacting the surface of the sensing head unit 200 is also detected.

[2. Configuration of Sensing Head Unit]

Figure 2:
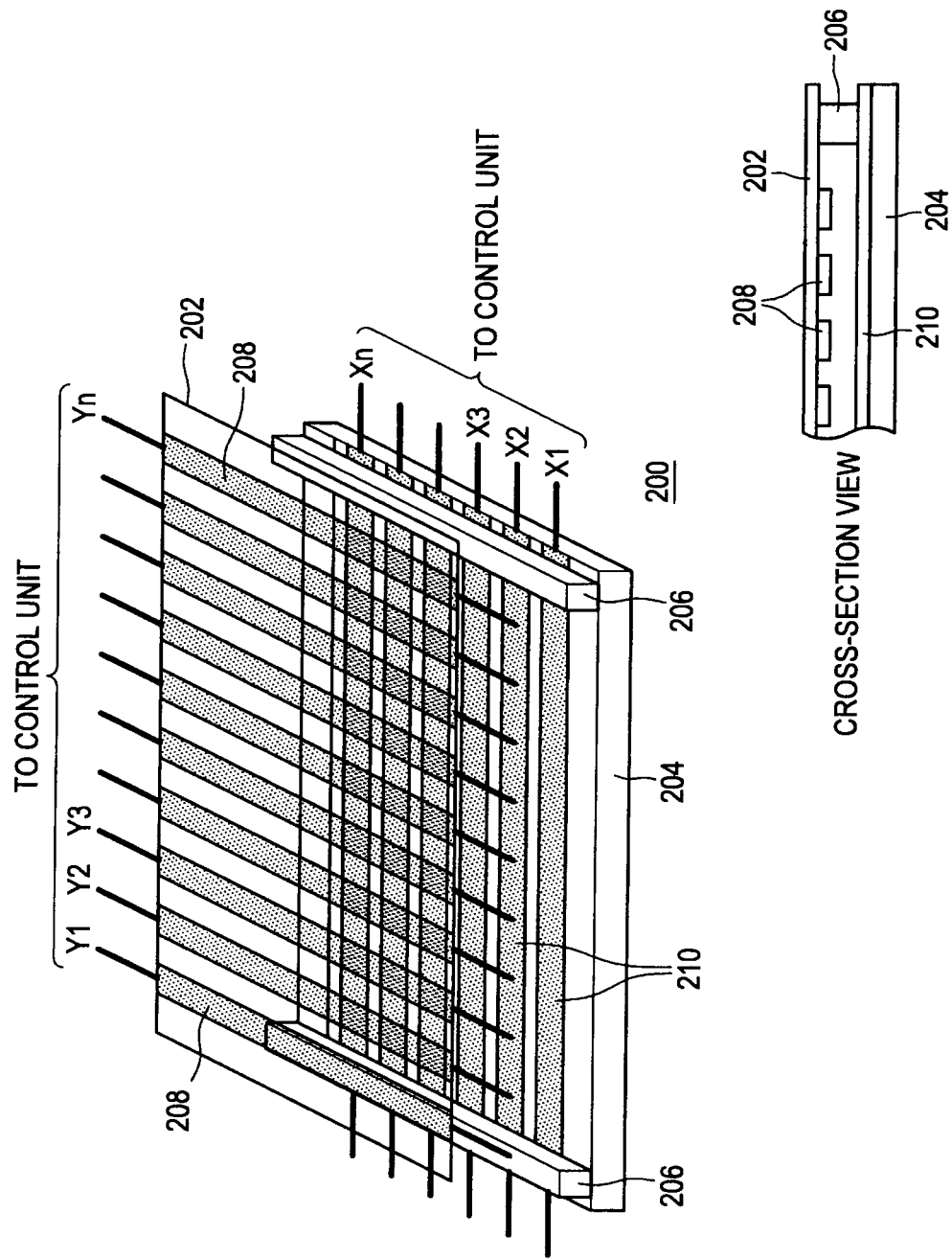
FIG. 2 is a schematic diagram illustrating a configuration of a sensing head unit.

FIG. 2 is a schematic view illustrating a configuration of the sensing head unit 200. The sensing head unit 200 includes an input plane member 202 installed on an input plane side through which the user performs an input using the finger or the stylus 150 and a base 204 installed at a position facing the input plane member 202. Both the input plane member 202 and the base 204 are installed in a flat plate form. A gap between the input plane member 202 and the base 204 are maintained from several micrometers (μm) to tens of μm by a space 206 as illustrated in a cross-sectional view in FIG. 2. The input plane member 202 is made of transparent polyethylene terephthalate (PET) having a thickness of about 0.2 mm. On the side of the input plane member 202 facing the base 204, a conductive layer 208 of a stripe shape having a predetermined resistance value such as a transparent electrode (an indium tin oxide (an ITO film) is formed to a uniform thickness. Here, it is assumed that n bodies of Y1 to Yn are formed as the conductive layer 208.

The base 204 is also made of transparent PET. On the side of the base 204 facing the input plane member 202, a conductive layer 210 of a stripe shape having a predetermined resistance value such as an ITO film is formed to a uniform thickness. The conductive layer 208 of the stripe shape of the input plane member 202 is orthogonal to the conductive layer 210 of the stripe shape of the base 204. Here, it is assumed that n bodies of X1 to Xn are formed as the conductive layer 210. A terminal of each of the conductive layers 208 and 210 is electrically connected with a control unit 300, which will be described later, by a lead line.

[3. Functional Block Configuration of Information Processing Device]

Figure 3:
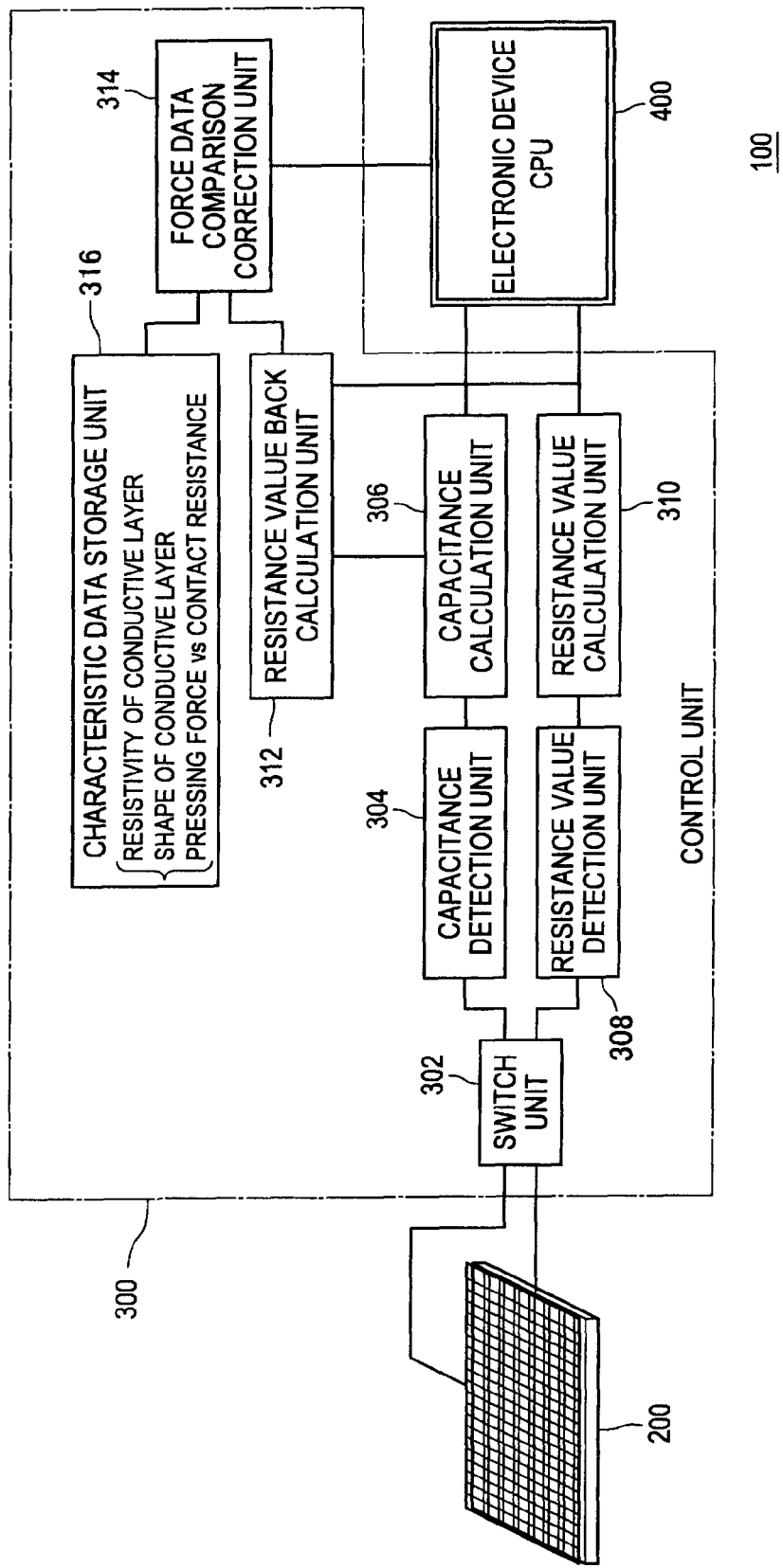
FIG. 3 is a functional block diagram of an information processing device according to an embodiment of the present invention.

FIG. 3 is a functional block diagram of the information processing device 100 according to the present embodiment. As illustrated in FIG. 2, the information processing device 100 includes the sensing head unit 200, the control unit 300, and a central processing unit (CPU) 400.

The control unit 300 controls a voltage to be applied to each of the conductive layers 208 and 210 of the sensing head unit 200. The control unit 300 processes a signal changed by proximity of the user's finger or the stylus 150, the two-dimensional position thereof, or the pressing force of the user's finger or the stylus 150 and calculates desired data and transmits the calculated data to the CPU 400 of the information processing device 100. The control unit 300 is installed between the sensing head unit 200 and the CPU 400.

The control unit 300 includes a switch unit 302, a capacitance detection unit 304, a capacitance calculation unit 306, a resistance value detection unit 308, a resistance value calculation unit 310, a resistance value back calculation unit 312, a force data comparison correction unit 314, and a property data storage unit 316.

The capacitance detection unit 304 detects a capacitance between the conductive layer 208 and the conductive layer 210 of the sensing head unit 200. The resistance value detection unit 308 detects a resistance value between the terminals of the conductive layers 208 and 210. The capacitance calculation unit 306 calculates a state in which the finger or the stylus 150 is approaching the input plane member 202 based on a change in capacitance detected by the capacitance detection unit 304. Further, the capacitance calculation unit 306 calculates the two-dimensional position of the finger or the stylus 150 on the input plane member 202 based on the capacitance value detected by the capacitance detection unit 304.

The resistance value calculation unit 310 counts the number of contact points where the conductive layers 208 and 210 contact each other when the input plane member 202 comes in contact with the base 204 by the pressing force of the finger or the stylus 150. Further, the resistance value calculation unit 310 calculates the pressing force and the two-dimensional position of the contact points based on a change in resistance value when the input plane member 202 comes in contact with the base 204 by the pressing force of the finger or the stylus 150.

The property data storage unit 316 is a memory that stores information of resistivity and size of the conductive layers 208 and 210. Further, when the conductive layer 208 comes in contact with the conductive layer 210, data representing a relationship between pressing force and contact resistance is stored in the property data storage unit 316. The resistance value back calculation unit 312 back-calculates a theoretical resistance value between the terminals of the conductive layers 208 and 210 based on the property data stored in the property data storage unit 316 and obtained two-dimensional data. The force data comparison correction unit 314 compares the back-calculated resistance value with an actually detected resistance value and corrects the pressing force that the finger or the stylus 150 applies to the input plane member 202.

Figure 4:
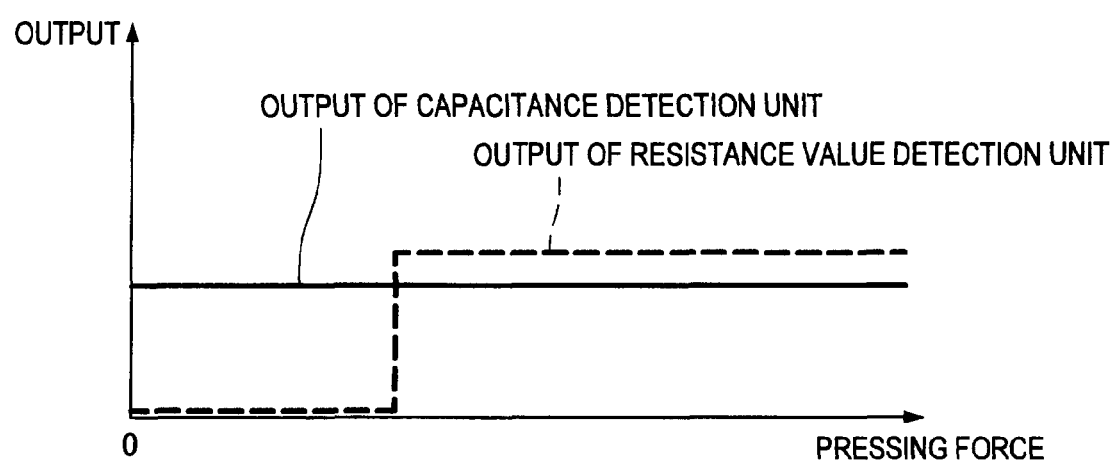
FIG. 4 is a diagram schematically illustrating a state in which outputs are obtained by a capacitance detection unit and a resistance value detection unit when an input plane member of a sensing head unit is pressed down by a finger.

FIG. 4 is a diagram schematically illustrating a state in which outputs are obtained by the capacitance detection unit 304 and the resistance value detection unit 308 when the input plane member 202 of the sensing head unit 200 is pressed down by the finger (or the stylus 150). As illustrated in FIG. 4, the capacitance detection unit 304 can detect a change in capacitance even if the pressing force has a small value. However, since a change in resistance value is not detected until the conductive layer 208 comes in contact with the conductive layer 210, the resistance value detection unit 308 cannot perform detection until the pressing force reaches a predetermined value (about 20 gf).

In the present embodiment, in view of a characteristic illustrated in FIG. 4, the position of the finger and a proximity state of the finger in the sensing head unit 200 are calculated based on the calculation result of the capacitance calculation unit 306, and the pressing force applied by the finger is calculated based on the calculation result of the resistance value calculation unit 310. As a result, when the pressing force is very small or even when the finger is approaching the input plane member 202 without contacting the input plane member 202, the position of the finger can be detected based on the capacitance with a high degree of accuracy. Further, by calculating the pressing force based on the calculation result of the resistance value calculation unit 310, the pressing force can be detected with a high degree of accuracy based on the number of contact points between the conductive layer 208 and the conductive layer 210 and the contact resistance between the conductive layer 208 and the conductive layer 210 after the conductive layer 208 comes in contact with the conductive layer 210. The switch unit 302 periodically switches an output of the sensing head unit 200 and transmits the output to the capacitance detection unit 304 and the resistance value detection unit 308.

[4. Operation of Information Processing Device According to Present Embodiment]

Figure 5A:
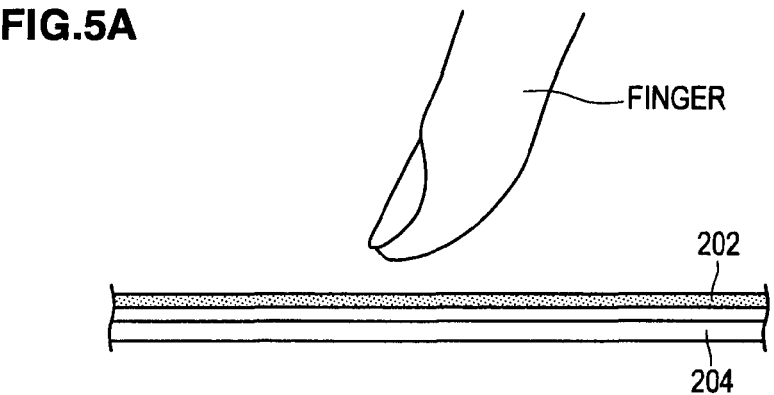
FIGS. 5A to 5D are schematic diagrams illustrating an operation of an information processing device according the present embodiment.
Figure 5B:
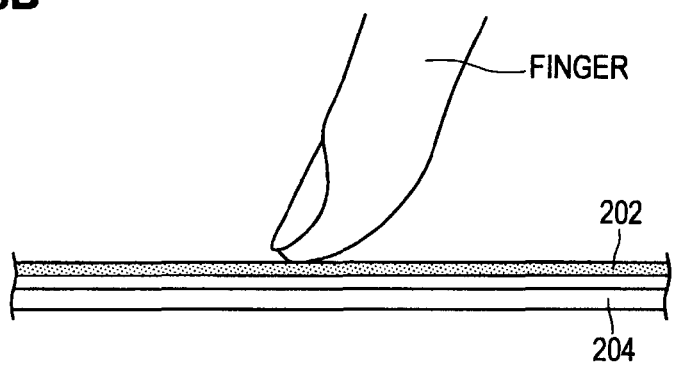
Figure 5C:
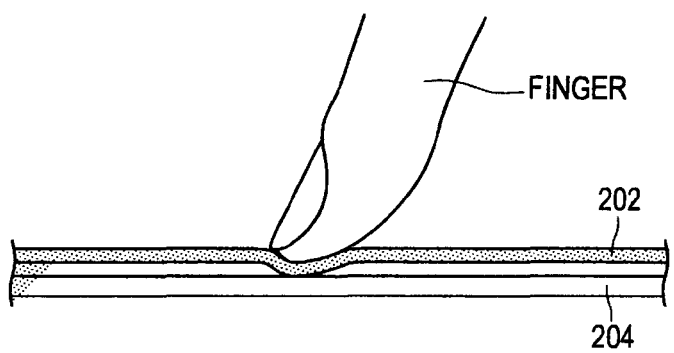

FIGS. 5A to 5C are schematic diagrams illustrating an operation of the information processing device 100 according to the present embodiment. A description will be made below on each position when the user's finger is gradually approaching the input plane member 202 as illustrated in FIGS. 5A to 5C. At this time, the switch unit 302 sequentially switches connection of the capacitance detection unit 304 and the resistance value detection unit 308 with the sensing head unit 200.

Figure 6:
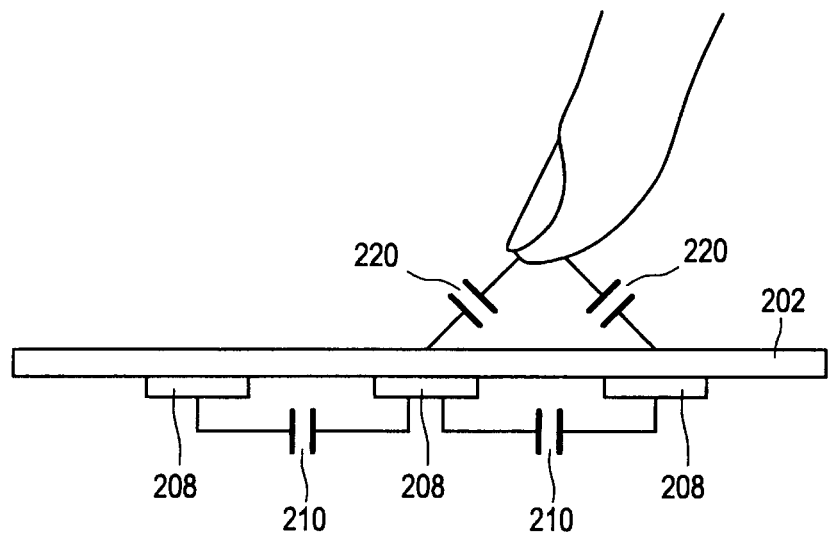
FIG. 6 is a schematic diagram illustrating an aspect in which a condenser is generated between a conductive layer and a finger when the finger has approached an input plane member.

FIG. 5A illustrates a case in which the finger is approaching the input plane member 202. Further, FIG. 6 illustrates a state in which a condenser 220 is generated between the conductive layer 208 and the finger when the finger has approached the input plane member 202. As illustrated in FIG. 6, the capacitance is present between the neighboring conductive layers 208, and the condenser 210 is generated. If the finger approaches the input plane member 202, the capacitance between the neighboring conductive layers 208 changes because the condenser 220 generated between itself and the finger has been added. In the conductive layer 210 of the base 204, a condenser is similarly generated between the conductive layer 210 and the finger, and thus capacitance between the neighboring conductive layers 210 changes. The capacitance detection unit 304 detects a change in capacitance in each of the conductive layers 208 and 210. The capacitance calculation unit 306 performs a calculation process on the change in capacitance and calculates the two-dimensional position (X, Y) of the finger. Specifically, the capacitance between the neighboring conductive layers 208 is calculated, and when a theoretical value of the capacitance when the finger is not present changes, it is judged whether or not the finger is positioned between the conductive layers 208 in which a change is occurring. The same calculation is performed between the neighboring conductive layers 210, and the two-dimensional position is finally calculated.

Further, since capacitance of the added condenser 220 changes depending on the distance between the finger and the input plane member 202, after specifying the two-dimensional (X, Y) position of the finger (or the stylus 150), the capacitance calculation unit 306 can obtain data on how close the finger is approaching the input plane member 202 based on an absolute value of the capacitance of the condenser 220. Further, although the capacitance between the neighboring conductive layers 208 is detected, the (X, Y) position of the finger and a degree of proximity to the input plane member 202 can also be detected between the conductive layers 210 that are formed on the input plane member 202 and the base 204 and are orthogonal to each other on the same principle.

FIG. 5B illustrates a case in which the finger comes in contact with the input plane member 202. In this case, a change in shape of the input plane member 202 does not occur yet, and a space is present between the input plane member 202 and the base 204 due to the space 205. Since the finger comes in contact with the input plane member 202, the capacitance viewed in FIG. 5A abruptly increases, but the two-dimensional position (X, Y) can be obtained on the same principle.

Further, since there is an air gap between the input plane member 202 and the base 204 in the state illustrated in FIG. 5B, the resistance value detected by the resistance value detection unit 308 becomes infinite (∞).

FIG. 5C illustrates a state in which the input plane member 202 is further pressed down by the finger (or the stylus 150) from the state of FIG. 5B. In the state illustrated in FIG. 5C, the input plane member 202 is deformed due to the pressing force, a part of the input plane member 202 comes in contact with the base 204, and the conductive layer 208 formed on the input plane member 202 is electrically connected with the conductive layer 210 formed on the base 204.

[5. Detection of Pressing Force]

Figure 7:
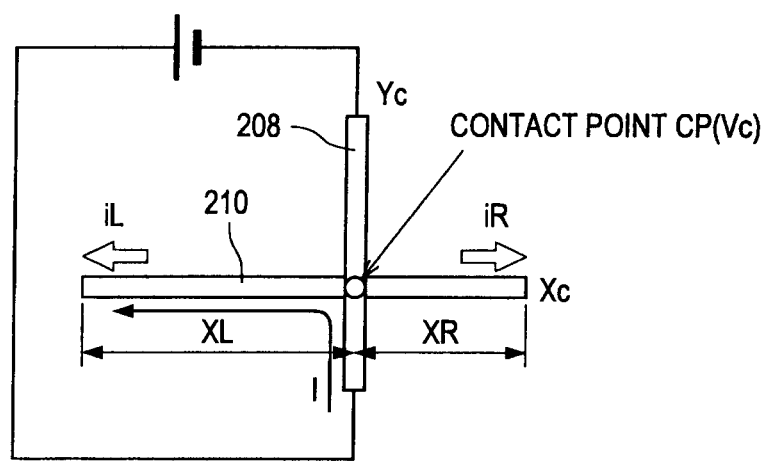
FIG. 7 is a schematic diagram illustrating a state in which one conductive layer Yc of a plurality of conductive layers 208 comes in contact with one conductive layer Xc of a plurality of conductive layers 210 at a contact point Vc.

FIG. 7 is a schematic diagram illustrating a state in which one conductive layer Yc of a plurality of conductive layers 208 comes in contact with one conductive layer Xc of a plurality of conductive layers 210 at a contact point CP. In this case, as illustrated in FIG. 7, a certain voltage is first applied to both terminals of all of the conductive layers 208 (Y1 to Yn) of the input plane member 202, and a voltage at the contact point CP is Vc. Further, the length from the contact point CP to the left terminal is XL, and the length from the contact point CP to the right terminal is XR. An electric current flowing to the left terminal is iL, and an electric current flowing to the right terminal is iR. Here, if a resistance value per unit length (resistivity) of the conductive layer 210 is r, resistance values in XL and XR are rXL and rXR, respectively, and thus iL and iR can be expressed as follows:

$$iL = Vc/rXL$$

$$iR = Vc/rXR$$

Thus, the following relationship is derived:

$$iL/iR = XR/XL$$

That is, if a ratio of the iL value and the iR value is found, a ratio of XR and XL is also found. XR+XL (=the length of the conductive layer 210) is stored in the property data storage unit 316, and thus an X coordinate of the contact point CP can be calculated.

The resistance value detection unit 308 reads the current value iL and the current value iR, and the resistance value calculation unit 310 calculates the X coordinate of the contact point CP using the above relationship. A calculation of a Y coordinate is performed in the opposite manner by applying a certain voltage to the conductive layer 210 (X1 to Xn) of the base 204 and reading an electric current flowing to the input plane member 202 through the contact point CP.

Figure 5D:
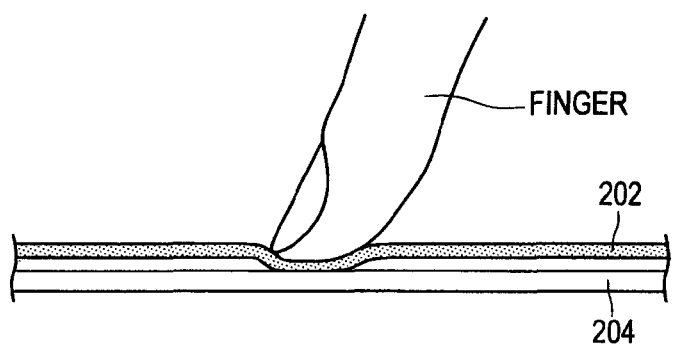

If the finger further presses the input plane member 202 down, as illustrated in FIG. 5D, the input plane member 202 is greatly deformed, and a plurality of contact points are formed between the input plane member 202 and the conductive layer 210. Since the number of contact points increases as the pressing force applied by the finger increases, the number of contact points is detected, such that rough pressing force corresponding to the number of contact points (an integer) can be obtained. The number of contact points can be detected by individually applying a voltage to each conductive layer 208 and individually detecting electric potential of each conductive layer 210. Further, if the pressing force changes, not only the number of contact points but also the contact resistance between the conductive layer 208 of the input plane member 202 and the conductive layer 210 of the base 204 changes. Thus, detailed pressing force is found based on the number of contact points and the contact resistance between the conductive layers 208 and 210, and the rough pressing force found based on the number of contact points can be compensated.

A value of the contact resistance can be found as follows. Based on resistivity and shape data of the conductive layers 208 and 210 stored in the property data storage unit 316 and the two-dimensional position (X, Y) calculated as described above, a theoretical resistance value corresponding to a position in each two-dimensional position when there is no contact resistance between the conductive layers 208 and 210 is calculated. For example, in FIG. 7, let us assume that due to a voltage E applied to both terminals of the conductive layer 208, electric current flows from a lower terminal of the conductive layer 208 to a left terminal of the conductive layer 210 through the contact point CP as illustrated by an arrow I. For the resistance values of the conductive layers 210 and 208, based on the resistivity of each conductive layer stored in the property data storage unit 316 and the length of each path that is previously found (X and Y coordinates of the contact point), a theoretical resistance value R on the current path is calculated.

Actually, since the contact resistance value Rc is generated by the size of the pressing force in the contact point CP, if this is considered, a total resistance value is (R+Rc).

An electric current value iL at the left terminal of the conductive layer 210 is detected by the resistance value detection unit 308 as a value including the contact resistance value Rc. Thus, the following equation is derived:

$$iL = E/(R+Rc)$$

Here, since R, E, and iL are previously known values, the contact resistance value Rc can be calculated.

Figure 8:
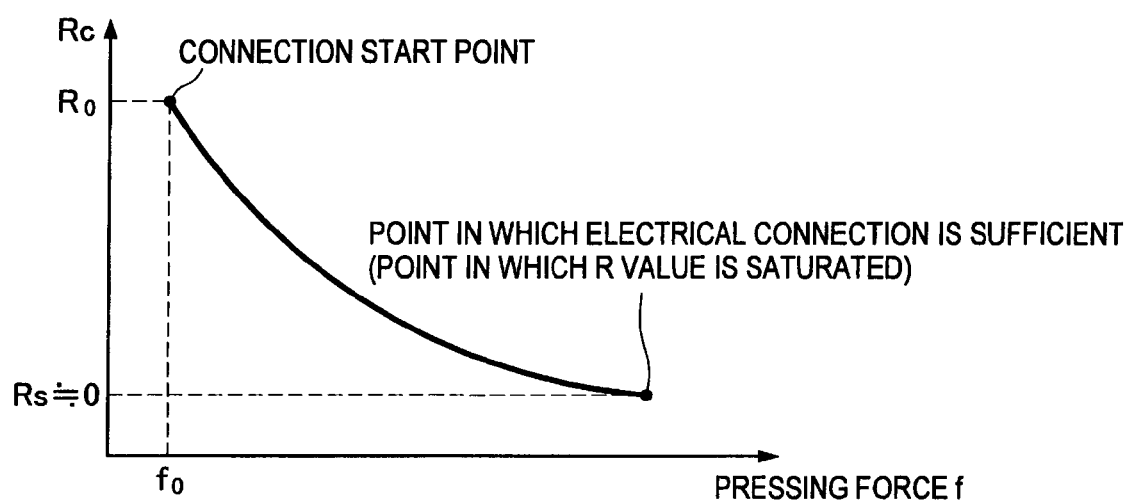
FIG. 8 is a characteristic diagram illustrating a relationship between pressing force f and contact resistance R that is stored in a characteristic data storage unit.

FIG. 8 is a characteristic diagram illustrating a relationship between the pressing force f and the contact resistance R that is stored in the characteristic data storage unit 316.

When the finger increases the pressing force and the state of FIG. 5C is created, the conductive layer 208 formed on the input plane member 202 comes in contact with the conductive layer 210 formed on the base 204 for the first time. This state is a "connection start point" in FIG. 8, and the value of the contact resistance has the largest Rc. As the pressing force increases, the resistance value R decreases, but the decrease is eventually saturated. A resistance value at this time is Rcs, and an actual value is nearly zero.

An f-Rc characteristic diagram illustrated here is obtained by an actual measurement of the conductive layer 208 and the conductive layer 210 at one certain contact point, but if the neighboring conductive layers have the same material and the same width value, the same relationship can be applied to all of the contact points. Of course, the characteristic data may be actually measured on all of the contact points and may be stored in the characteristic data storage unit 316.

Figure 9:
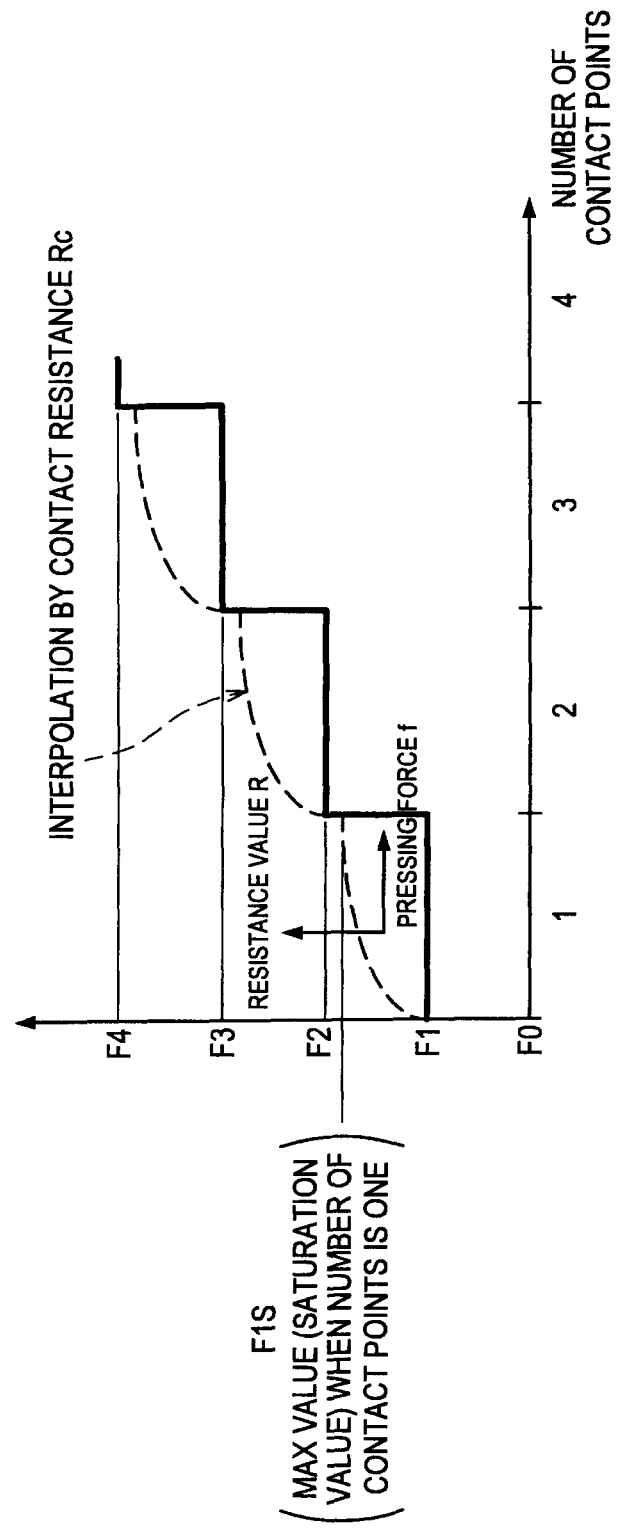
FIG. 9 is a schematic diagram illustrating a process of interpolating pressing force found based on the number of contact points by pressing force found based on contact resistance.

FIG. 9 is a schematic diagram illustrating a process of interpolating the pressing force found based on the number of contact points by the pressing force found based on the contact resistance. As described above, based on the number of contact points between the conductive layer 208 and the conductive layer 210, the rough pressing force applied by the user's finger is found. A feature illustrated as a solid line in FIG. 9 illustrates the pressing force found based on the number of contact points. When the number of contact points is one (1), the pressing force has a value from F1 to F2. Similarly, when the number of contact points is two (2), the pressing force has a value from F2 to F3, and when the number of contact points is three (3), the pressing force has a value from F3 to F4. As described above, the pressing force found based on the number of contact points has a relatively rough value and transitions in the form of a step. In order to interpolate the pressing force found based on the number of contact points, the characteristic of FIG. 8 may be used. For example, when the number of contact points is one (1), that is, when the corresponding contact point starts connection for the first time, the pressing force f (at the "connection start point" in FIG. 8) is F1. However, as the pressing force increases, the contact resistance value decreases as in the characteristic of FIG. 8 and is finally saturated to a point close to zero. The pressing force at this time is F1s illustrated in FIG. 9. Transition of the pressing force at this time can be decided by the f-Rc characteristic of FIG. 8 stored in the characteristic data storage unit and the contact resistance value Rc that can be calculated as described above. When the number of contact points increases like 2, 3, and 4, similarly, a portion between the pressing forces of the step shape detected based on the number of contact points is interpolated, and thus the more accurate pressing force can be measured.

As described above, according to the present embodiment, when the user's finger approaches the input plane member 202 and finally presses the input plane member 202 down, the two-dimensional position of the finger on the input plane member 202 can be found based on a calculation of the capacitance. At this time, not only when the finger comes in contact with the input plane member 202, but also when the finger is present above the input plane member 202, a degree of proximity can be detected based on the capacitance. Further, the pressing force when the finger presses the input plane down can be found based on the contact state between the conductive layer 208 and the conductive layer 210. Thus, the position and the pressing force of the finger can be detected by a single system including the conductive layers 208 and 210.

Further, in the present embodiment, through the configuration including the sensing head unit 200, the control unit 300, and the CPU 400, the two-dimensional XY position can be detected as in the existing touch panel, and proximity of the user and the stylus 150 to the input plane member 202 and the pressing force can be detected and transmitted to the CPU 400. Thus, compared to the case in which the same function is implemented by combining separate devices that separately perform position detection and pressing force detection, it is easy to design a mechanism of the sensing head unit 200, and the case of the information processing device 100 does not need a high degree of accuracy. Thus, it is appropriate for mass production, and the cost of the case can be reduced. Further, since the number of devices used is reduced, the total cost of the device itself or the maintenance cost can be reduced.

Further, since the sensing head unit 200 has features of both the capacitive touch panel and the resistive touch panel, detection corresponding to both the finger (not dedicated) and the stylus can be performed. Further, since it is a capacitive type, in the case of reading the two-dimensional position, the pressing force is actually finished at 0 gf, and not only one finger or stylus, but also a plurality of fingers or styluses can be simultaneously detected.

The exemplary embodiments of the present invention have been described above in detail with reference to the appended drawings. The present invention is not limited to the above embodiments. It should be understood by those skilled in the art that various modifications and changes can be made within the scope of the technical spirit stated in the claims and are within the technical scope of the present invention.

The present application contains subject matter related to that disclosed in Japanese Priority Patent Application JP 2010-088283 filed in the Japan Patent Office on Apr. 7, 2010, the entire content of which is hereby incorporated by reference.

What is claimed is:

1. An electronic device, comprising:
   an input plane member that includes a plurality of first conductive layers formed in an island shape and is elastically deformed when a pressing operation is received from a user;
   a base that is disposed to face the input plane member and includes a plurality of second conductive layers with an island shape that comes in contact with the first conductive layer when the input plane member is deformed;
   a capacitance detection unit that detects capacitance between the plurality of first conductive layers and between the plurality of second conductive layers;
   a resistance value detection unit that detects a resistance value between the first conductive layer and the second conductive layer when the first conductive layer comes in contact with the second conductive layer due to deformation of the input plane member; and
   a switch unit that controls electrical connection between the first conductive layer and the second conductive layer and either of the capacitance detection unit and the resistance value detection unit.

2. The electronic device according to claim 1, wherein the first conductive layer and the second conductive layer have a stripe shape together and extend in a direction orthogonal to each other.

3. The electronic device according to claim 1, comprising a display screen that displays information, wherein the input plane member and the base are made of a transparent material and are installed on the display screen.

4. The electronic device according to claim 1, comprising a capacitance calculation unit that calculates, based on a change of the capacitance, a two-dimensional position on the input plane member by the user's pressing operation or how close an operation by the user approaches the input plane member.

5. The electronic device according to claim 1, comprising a resistance value calculation unit that calculates at least pressing force applied to the input plane member based on the resistance value.

6. The electronic device according to claim 5, wherein the resistance value calculation unit calculates a two-dimensional position on the input plane member of the user's pressing operation based on the resistance value.

7. The electronic device according to claim 5, comprising a resistance value back calculation unit that back-calculates theoretical resistance values of the first conductive layer and the second conductive layer in a two-dimensional position on the input plane member by the user's operation based on the two-dimensional position, wherein the resistance value calculation unit finds the number of contact points when the first conductive layer comes in contact with the second conductive layer by the user's pressing operation, and the electronic device includes a correction unit that compares the theoretical resistance value with the detected resistance value and corrects pressing force found based on the number of contact points.

8. The electronic device according to claim 1, wherein pressing force applied to the input plane member is calculated based on the number of contact points when the first conductive layer comes in contact with the second conductive layer by the user's pressing operation.

9. The electronic device according to claim 1, wherein the plurality of first conductive layers formed in the island shape is provided as strips arranged along a first direction upon the input plane member, and the plurality of second conductive layers with the island shape is provided as strips arranged along a second direction upon the base.

10. The electronic device according to claim 9, wherein the first direction is orthogonal to the second direction.

11. The electronic device according to claim 9, wherein at least a portion of the strips of the plurality of first conductive layers comes into contact with a portion of the strips of the plurality of second conductive layers when the input plane member is deformed.

12. The electronic device according to claim 11, wherein a pressing force applied to the input plane member is determined based on a number of points in contact between the portion of the strips of the plurality of first conductive layers and the portion of the strips of the plurality of second conductive layers.

\* \* \* \* \*